E. L. WEE.
WIRE FENCE STRUCTURE.
APPLICATION FILED MAR. 25, 1916.

1,276,840.

Patented Aug. 27, 1918.

Witness
Inventor
E. L. Wee,
By
Attorney

UNITED STATES PATENT OFFICE.

ELI L. WEE, OF HUXLEY, IOWA.

WIRE-FENCE STRUCTURE.

1,276,840.  Specification of Letters Patent.  Patented Aug. 27, 1918.

Application filed March 25, 1916. Serial No. 86,681.

*To all whom it may concern:*

Be it known that I, ELI L. WEE, a citizen of the United States, residing at Huxley, in the county of Story and State of Iowa, have invented certain new and useful Improvements in Wire-Fence Structures; and I do hereby declare the following to be a full, clear, and exact description of the invention, such as will enable others skilled in the art to which it appertains to make and use the same.

This invention relates to new and useful improvements in wire fence structures and the principal object of invention is to improve the form tie between the line and the stay wires of a fence.

Another object of the invention is to provide a strong and durable tie between the line and stay wires which is so constructed as to interlace the ends of the stay wires and yet lock them in place on the line wires.

With these and other objects in view, the invention consists in the novel combination and arrangement of parts which will be fully set forth in the following specification and accompanying drawing, in which:—

Figure 1:
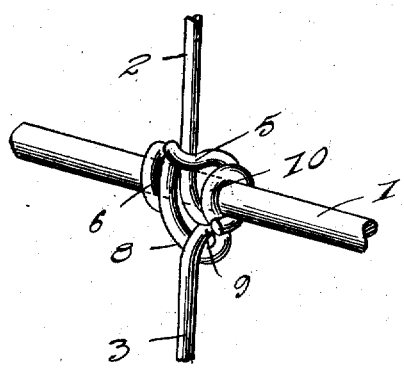
Figure 1 is a perspective view of a wire tie constructed in accordance with this invention.

Referring to the drawing the numeral 1 designates the line wire of the fence while the numeral 2 designates the upper stay wire. The lower stay wire is designated by the numeral 3 and coöperates with the upper stay wire and line wire as clearly shown in the drawing.

Figure 2:
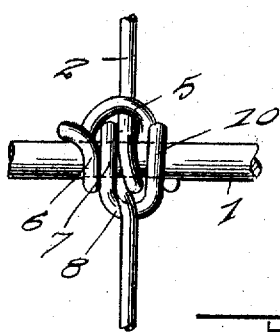
Fig. 2 is face view of the same.
Figure 3:
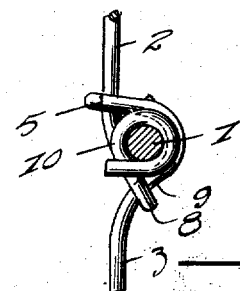
Fig. 3 is an end view of Fig. 2.
Figure 4:
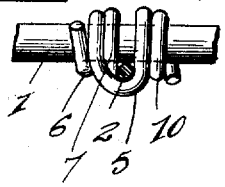
Fig. 4 is a top plan view of Fig. 2.
Figures 5, 6:
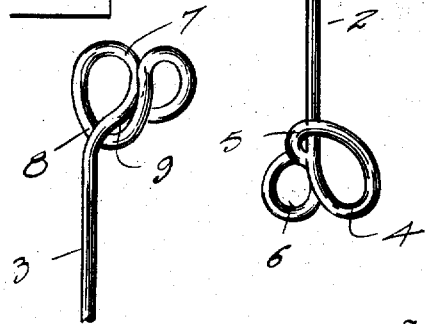
Fig. 5 is a detail perspective view illustrating the bend of the lower stay wire.
Fig. 6 is a view similar to Fig. 5 illustrating the bend of the upper stay wire.

The lower end of the stay wire 2 is bent around the line wire as at 4 and then continued upwardly and is bent around itself immediately above the line wire as at 5, thus forming a complete loop. This loop, it will be seen, completely embraces the line wire and frictionally engages the same, and the end of the portion 5 then continues downwardly and outwardly to embrace the loop of the coöperating stay wire and is then bent as at 6 to form the loop which embraces the line wire on the side opposite the loop 4. The loop 6 is bent tightly about the line wire and firmly engages the same, and it will thus be seen that the stay wire 2 will be locked against movement. The upper end of the stay wire 3 is then formed with the loop 7 which continues around the line wire as illustrated in Fig. 2 and is bent downwardly to form the bight portion 8 which engages the stay 3 immediately below the line wire. As illustrated in Fig. 5 it will be seen that the stay wire is provided with a bend 9 which permits the wire 3 to vertically aline with the wire 2, and it will be apparent that the bight portion 8 engages said portion 9 immediately beneath the line wire 1 and then continues upwardly to form the lateral loop 10 which embraces the line wire immediately adjacent the loop 4 of the upper stay wire. As shown in Fig. 2 it will be seen that the loop 7 is positioned between the lateral loop 6 and the loop 4 of the stay wire 2, while the loop 4 of the stay wire 2 is positioned between the loop 7 of the stay wire 3 and the loop 10. In this way it will be seen that the loops 6 and 10 forming the binding loops are tightened on the line wire and thus the whole tie will be firmly locked in place.

While in the foregoing there has been shown and described the preferred embodiment of this invention, it is to be understood that such changes may be made in the combination and arrangement of parts as will fall within the spirit and scope of the appended claim.

What is claimed is:—

In a wire fence structure, the combination with a line wire, of a pair of stay wires looped at their free ends to surround the line wire, loops at the ends of the first-mentioned loops extending around the stay wires and binding loops formed on the ends of the second-mentioned loops and surrounding the line wire to firmly secure the whole in place, each of said first-mentioned loops having their sides engaged, and said binding loops extending in opposite directions to engage the opposite sides of the first-mentioned loops, and said stay wires being bent slightly inwardly above and below the first-mentioned loops to bring the stay wires in alinement with each other and thereby provide an even pull on the line wire.

In testimony whereof I affix my signature in presence of two witnesses.

ELI L. WEE.

Witnesses:
CHRIS. WEE,
L. C. SHELDAHL.

Copies of this patent may be obtained for five cents each, by addressing the "Commissioner of Patents, Washington, D. C."